United States Patent
Bheda

(10) Patent No.: US 11,104,059 B2
(45) Date of Patent: *Aug. 31, 2021

(54) REINFORCED FUSED-DEPOSITION MODELING

(71) Applicant: Arevo, Inc., Santa Clara, CA (US)

(72) Inventor: Hemant Bheda, Saratoga, CA (US)

(73) Assignee: Arevo, Inc., Milpitas, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/997,319

(22) Filed: Jun. 4, 2018

(65) Prior Publication Data

US 2019/0001550 A1    Jan. 3, 2019

Related U.S. Application Data

(63) Continuation of application No. 15/375,832, filed on Dec. 12, 2016, now Pat. No. 10,011,073, which is a
(Continued)

(51) Int. Cl.
    *B29C 64/118*      (2017.01)
    *B29C 64/165*      (2017.01)
    (Continued)

(52) U.S. Cl.
    CPC ............ *B29C 64/118* (2017.08); *B29C 64/10* (2017.08); *B29C 64/112* (2017.08);
    (Continued)

(58) Field of Classification Search
    CPC ..... B29C 64/10; B29C 64/106; B29C 64/386; B29C 64/40; B29C 64/118; B29C 64/165;
    (Continued)

(56) References Cited

U.S. PATENT DOCUMENTS

| 4,665,492 A | 5/1987 | Masters |
| 4,750,960 A | 6/1988 | Bubeck |

(Continued)

FOREIGN PATENT DOCUMENTS

WO    WO-2011128110 A1    10/2011

OTHER PUBLICATIONS

Devlieg, et al. High-Speed Fiber Placement on Large Complex Structures. Sae Technical Paper 2007-01-3843, 2007.
(Continued)

*Primary Examiner* — Jeffrey M Wollschlager

(57) ABSTRACT

An apparatus for manufacturing an object includes an extrusion head having an extrusion needle for extruding thermoplastic material associated with one or more fiber strands. The apparatus may further include a turn-table, a more robotic arm for moving the extrusion head and needle, thermoplastic filament and fiber strand spools and thermoplastic filament and fiber strands. A controller is provided for directing the robotic arm, extrusion head and the turn-table. Further, a method for manufacturing an object includes generating a design for the object that substantially satisfies desired structural properties of the object and generating a sequence for extruding one or more beads of thermoplastic material to manufacture the object according to the design, in which the one or more beads of thermoplastic material are associated with one or more fiber strands. The one or more beads of thermoplastic material and the associated one or more fiber strands are then extruded according to the sequence.

11 Claims, 1 Drawing Sheet

Related U.S. Application Data continuation of application No. 14/184,010, filed on Feb. 19, 2014, now abandoned.

(60) Provisional application No. 61/766,376, filed on Feb. 19, 2013.

(51) Int. Cl.

| | | |
|---|---|---|
| *B29C 64/112* | (2017.01) | |
| *B29C 64/10* | (2017.01) | |
| *B29C 64/40* | (2017.01) | |
| *B33Y 10/00* | (2015.01) | |
| *B33Y 30/00* | (2015.01) | |
| *B33Y 50/02* | (2015.01) | |
| *B29C 64/321* | (2017.01) | |
| *B29C 64/336* | (2017.01) | |
| *B29C 64/307* | (2017.01) | |
| *B29K 105/06* | (2006.01) | |

(52) U.S. Cl.
CPC ............ *B29C 64/165* (2017.08); *B29C 64/40* (2017.08); *B33Y 10/00* (2014.12); *B33Y 30/00* (2014.12); *B33Y 50/02* (2014.12); *B29C 64/307* (2017.08); *B29C 64/321* (2017.08); *B29C 64/336* (2017.08); *B29K 2105/06* (2013.01)

(58) Field of Classification Search
CPC ..... B29C 64/20; B29C 64/112; B29C 64/321; B29C 64/336; B29C 64/307; B29C 64/393; B33Y 10/00; B33Y 30/00; B33Y 50/02; B29K 2105/06
See application file for complete search history.

(56) References Cited

U.S. PATENT DOCUMENTS

| | | | |
|---|---|---|---|
| 4,976,012 A | 12/1990 | McConnell | |
| 5,071,503 A | 12/1991 | Berman | |
| 5,121,329 A * | 6/1992 | Crump | G05B 19/4099 700/119 |
| 5,136,515 A | 8/1992 | Helinski | |
| 5,257,657 A | 11/1993 | Gore | |
| 5,303,141 A | 4/1994 | Batchelder et al. | |
| 5,340,433 A | 8/1994 | Crump | |
| 5,402,351 A | 3/1995 | Batchelder et al. | |
| 5,527,431 A | 6/1996 | Shetty et al. | |
| 5,617,911 A | 4/1997 | Sterett et al. | |
| 5,645,884 A | 7/1997 | Harlow, Jr. et al. | |
| 5,718,951 A | 2/1998 | Sterett et al. | |
| 5,936,861 A * | 8/1999 | Jang | G05B 19/4099 700/98 |
| 5,939,008 A * | 8/1999 | Comb | B33Y 10/00 264/308 |
| 5,969,971 A | 10/1999 | Brown et al. | |
| 6,022,207 A * | 2/2000 | Dahlin | B29C 64/106 425/145 |
| 6,149,072 A | 11/2000 | Tseng | |
| 6,153,034 A | 11/2000 | Lipsker | |
| 6,214,279 B1 | 4/2001 | Yang et al. | |
| 6,216,765 B1 | 4/2001 | Tseng et al. | |
| 6,372,178 B1 | 4/2002 | Tseng | |
| 6,405,095 B1 | 6/2002 | Jang et al. | |
| 6,572,807 B1 | 6/2003 | Fong | |
| 6,685,866 B2 | 2/2004 | Popa et al. | |
| 6,814,823 B1 | 11/2004 | White | |
| 6,851,587 B1 | 2/2005 | Tseng | |
| 6,934,600 B2 | 8/2005 | Jang et al. | |
| 7,604,470 B2 | 10/2009 | Labossiere et al. | |
| 7,662,321 B2 | 2/2010 | Guo et al. | |
| 7,754,807 B2 | 7/2010 | Priedeman et al. | |
| 7,767,130 B2 | 8/2010 | Elsner et al. | |
| 7,790,074 B2 | 9/2010 | Pan et al. | |
| 8,349,239 B2 | 1/2013 | Hopkins et al. | |
| 8,778,252 B2 * | 7/2014 | Mackie | B29C 64/106 264/308 |
| 9,168,699 B2 | 10/2015 | Pax | |
| 9,511,543 B2 * | 12/2016 | Tyler | B29C 64/209 |
| 9,669,586 B2 | 6/2017 | Page et al. | |
| 9,908,145 B2 | 3/2018 | Farmer et al. | |
| 9,931,776 B2 * | 4/2018 | Butcher | B29C 48/0022 |
| 10,011,073 B2 | 7/2018 | Bheda et al. | |
| 10,427,352 B2 * | 10/2019 | Farmer | B29C 64/106 |
| 2002/0129485 A1 | 9/2002 | Mok et al. | |
| 2003/0004600 A1 | 1/2003 | Priedeman et al. | |
| 2004/0129823 A1 | 7/2004 | Swanson et al. | |
| 2004/0222561 A1 | 11/2004 | Hopkins | |
| 2005/0115421 A1 | 6/2005 | Lyons | |
| 2005/0266203 A1 | 12/2005 | La Forest et al. | |
| 2006/0158456 A1 | 7/2006 | Zinniel et al. | |
| 2007/0003656 A1 | 1/2007 | Labossiere et al. | |
| 2007/0228590 A1 | 10/2007 | Labossiere et al. | |
| 2007/0228592 A1 | 10/2007 | Dunn et al. | |
| 2008/0196825 A1 | 8/2008 | Hamlyn | |
| 2008/0202691 A1 | 8/2008 | Hamlyn et al. | |
| 2009/0229760 A1 | 9/2009 | Hamlyn et al. | |
| 2010/0140849 A1 | 6/2010 | Comb et al. | |
| 2010/0229671 A1 | 9/2010 | Haniya et al. | |
| 2010/0252183 A1 | 10/2010 | Munaux et al. | |
| 2010/0327479 A1 | 12/2010 | Zinniel et al. | |
| 2011/0060445 A1 | 3/2011 | Heenan | |
| 2011/0079936 A1 | 4/2011 | Oxman | |
| 2011/0199104 A1 | 8/2011 | Paul et al. | |
| 2011/0233804 A1 | 9/2011 | Batchelder et al. | |
| 2011/0272126 A1 | 11/2011 | Hamlyn et al. | |
| 2012/0072001 A1 | 3/2012 | Knighton | |
| 2012/0159785 A1 | 6/2012 | Pyles et al. | |
| 2012/0231225 A1 | 9/2012 | Mikulak et al. | |
| 2013/0209600 A1 | 8/2013 | Tow | |
| 2013/0328228 A1 | 12/2013 | Pettis et al. | |
| 2013/0337256 A1 | 12/2013 | Farmer et al. | |
| 2014/0027952 A1 | 1/2014 | Fan et al. | |
| 2014/0043630 A1 | 2/2014 | Buser et al. | |
| 2014/0070461 A1 * | 3/2014 | Pax | B29C 64/118 264/401 |
| 2014/0175706 A1 | 6/2014 | Kritchman et al. | |
| 2014/0232035 A1 | 8/2014 | Bheda | |
| 2014/0287139 A1 | 9/2014 | Farmer et al. | |
| 2014/0291886 A1 | 10/2014 | Mark et al. | |
| 2014/0361460 A1 * | 12/2014 | Mark | B29C 31/045 264/248 |
| 2015/0165666 A1 * | 6/2015 | Butcher | B29C 64/165 428/373 |
| 2015/0183159 A1 * | 7/2015 | Duty | B29C 64/118 428/195.1 |
| 2015/0202646 A1 * | 7/2015 | Fischer | B05C 1/04 427/434.6 |
| 2016/0114532 A1 | 4/2016 | Schirtzinger et al. | |
| 2016/0167299 A1 | 6/2016 | Jallouli et al. | |
| 2016/0176109 A1 * | 6/2016 | Farmer | B29C 64/106 264/171.1 |
| 2016/0297104 A1 | 10/2016 | Guillemette et al. | |
| 2016/0333152 A1 | 11/2016 | Cook et al. | |
| 2017/0087768 A1 | 3/2017 | Bheda | |
| 2017/0252967 A9 | 9/2017 | Guillemette et al. | |

OTHER PUBLICATIONS

"Non Final Office Action" dated Dec. 19, 2016 in related U.S. Appl. No. 14/184,010.
Marcus et al., Solid Freeform Fabrication Symposium dated Feb. 21, 1994, p. 234.
Office action dated Feb. 2, 2017 for U.S. Appl. No. 15/375,832.
Office action dated Jun. 8, 2017 for U.S. Appl. No. 15/375,832.
Office action dated Sep. 5, 2017 for U.S. Appl. No. 15/375,832.
U.S. Appl. No. 14/184,010 dated Dec. 20, 2017.

(56) References Cited

OTHER PUBLICATIONS

U.S. Appl. No. 14/184,010 Office Action dated Jun. 29, 2018.
U.S. Appl. No. 15/375,832 Notice of Allowance dated May 4, 2018.
U.S. Appl. No. 15/375,832 Office Action dated Mar. 9, 2018.

* cited by examiner

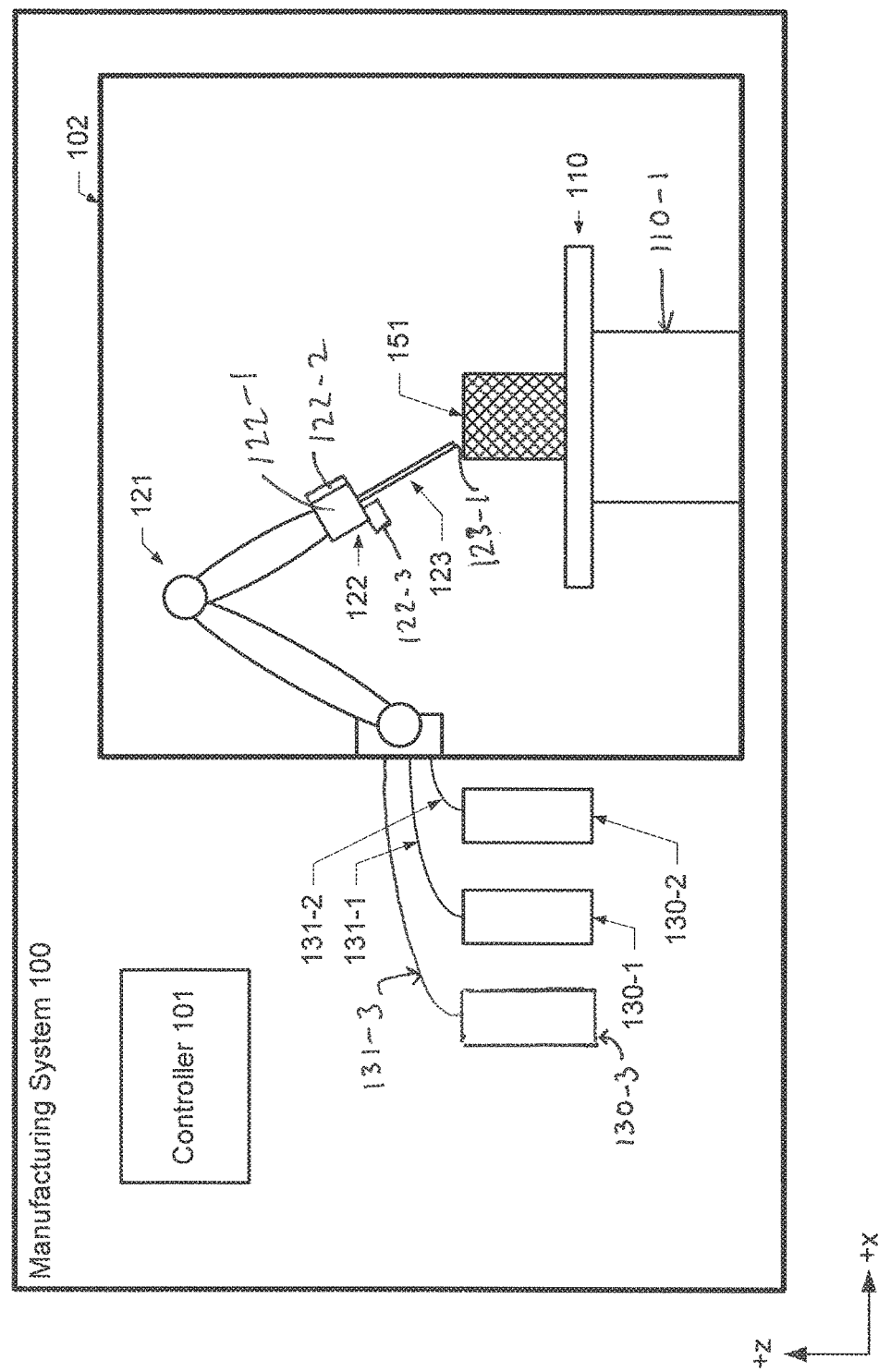

REINFORCED FUSED-DEPOSITION MODELING

RELATED APPLICATIONS

The present application is a continuation of U.S. patent application Ser. No. 15/375,832, filed Dec. 12, 2016, now U.S. Pat. No. 10,011,073, which is a continuation of U.S. patent application Ser. No. 14/184,010, filed Feb. 19, 2014, which claims the benefit of U.S. Provisional Patent Application No. 61/766,376, filed Feb. 19, 2013, each of which is entirely incorporated herein by reference. If there are any contradictions or inconsistencies in language between this application and the case that has been incorporated by reference that might affect the interpretation of the claims in this case, the claims in this case should be interpreted to be consistent with the language in this case.

FIELD

The present disclosure relates to manufacturing, and, more particularly, to fused-deposition modeling.

BACKGROUND

Fused-deposition modeling is a technique for building a three-dimensional object from a mathematical model of the object. In general, the object is built by feeding a thermoplastic filament into a heated extrusion head. The heated extrusion head melts and deposits the molten thermoplastic material as a series of beads. Each bead is roughly spherical or cylindrical in shape—and is much like the toothpaste that is squeezed from a tube—but much smaller than a grain of rice. Typically, a bead is between $0.001^{th}$ to $0.010^{th}$ of an inch thick. When a bead is deposited, it is just slightly above its melting point. After it is deposited, the bead quickly solidifies and fuses with the beads that are next to and below it.

Perhaps the greatest advantage of fused-deposition modeling is that it can build an object of any shape. To accomplish this, however, there are constraints on the sequence in which the beads can be deposited. First, each bead must be supported. In other words, a bead cannot be deposited on air. Therefore, each bead must be deposited on:

(i) a platform that is not part of the object, or (ii) one or more previously-deposited beads that will be part of the object, or (iii) a temporary scaffold of support material that is not part of the object, or (iv) any combination of i, ii, and iii.

Second, when a three-dimensional surface is sealed with beads, it is no longer possible to deposit a bead inside of that surface. This is analogous to the situation in which once you close a box, you can't put anything into the box.

There is a general methodology that is used in fused-deposition modeling that satisfies these constraints and enables the building of an object of any shape. The three-dimensional model of the object is modeled as thousands of thin layers in the X-Y plane. Each layer is modeled as thousands of beads and voids. The object is then built, one bead at a time, one layer at a time, only in the +Z direction.

There are, however, costs and disadvantages associated with traditional fused-deposition modeling.

SUMMARY

One of the disadvantages of traditional fused-deposition modeling is that the resulting objects are not strong enough for many applications. That is why the objects are often used only as models or prototypes of "real" objects.

Embodiments of the present disclosure address this deficiency by combining fiber strands with fused-deposition modeling to create fiber-reinforced objects. In general, fiber-reinforced objects are much stronger than unreinforced objects.

A fiber-reinforced object is built by depositing one or more fiber strands in association with one or more beads of thermoplastic material. A fiber strand and a bead can be associated in which:

(i) the fiber strand is wholly within the bead, or (ii) the fiber strand is partially within the bead, or (iii) the fiber strand is adjacent to the bead, or (iv) any combination of i, ii, and iii.

A fiber strand and an associated bead can be deposited together or separately. The fiber strand can be deposited first and then the bead can be deposited. Alternatively, the bead can be deposited first and then the fiber strand can be deposited. One fiber strand can be associated with one or more beads, and one bead can be associated with one or more fiber strands.

The length of a fiber strand can be:

(i) "short," or (ii) "medium," or (iii) "long."

A "short-length" fiber strand has a maximum length that is less than twice the minimum dimension of a bead. The angular orientation of the longitudinal or neutral axis of a short-length fiber strand associated with a bead is generally correlated with the longitudinal or neutral axis of the bead. Although the ends of a short-length fiber strand can extend beyond the wall of a bead—like a spine on a cactus—a short-length fiber strand intersects only one bead and its immediate neighbors. In accordance with some embodiments of the present disclosure, short-length fiber strands are cut before being deposited, but in other embodiments the short-length fiber strands are cut while being deposited.

A "long-length" fiber strand has a length that is approximately equal to the length of a bead. The angular orientation of a long-length fiber strand associated with a bead is generally parallel to the longitudinal or neutral axis of the bead. In accordance with some embodiments of the present disclosure, long-length fiber strands are cut while being deposited, but in other embodiments the long-length fiber strands are cut before being deposited.

A "medium-length" strand has a length longer than a short-length fiber strand and shorter than a long-length fiber strand. The angular orientation of a medium-length fiber strand associated with a bead is generally parallel to the longitudinal or neutral axis of the bead. In accordance with some embodiments of the present disclosure, short-length fiber strands are cut before being deposited, but in other embodiments the short-length fiber strands are cut while being deposited.

In accordance with embodiments of the present disclosure, a bead can be associated with a fiber strand made of glass, carbon, aramid, cotton, wool, or any other fibrous material.

A bead can be associated with one or more bundles of fiber strands. A bundle of fiber strands can be grouped as a tow, a yarn, or a braid. The cross section of a bundle of fiber strands can be flat, cylindrical, rectangular, triangular, or irregular. A bundle of fiber strands can comprise fiber strand made of one or more materials (e.g., glass and carbon, glass and aramid, carbon and aramid, glass and carbon and aramid, etc.).

An object that is built in accordance with present disclosure can comprise:
- (i) beads that are not associated with a fiber strand, or
- (ii) beads that are associated with "short" strands, or
- (iii) beads that are associated with "medium" strands, or
- (iv) beads that are associated with "long" strands, or
- (v) any combination of i, ii, iii, and iv.

In accordance with some embodiments of the present disclosure, the thermoplastic filament comprises one or more fiber strands (or one or more bundles of fiber strands) prior to being fed into the extrusion head. In some alternative embodiments, one or more fiber strands (or one or more bundles of fiber strands) are combined with the thermoplastic material during deposition.

Some embodiments of the present disclosure comprise a plurality of thermoplastic filaments in which at least one of the filaments does not comprise a fiber strand and at least one of the filaments does comprise a fiber strand. Furthermore, some embodiments of the present disclosure comprise a plurality of thermoplastic filaments that each comprise:
- (i) a fiber strand of different length, or
- (ii) a fiber strand of different material, or
- (iii) a fiber strand of different modulus, or
- (iv) a different bundle of fiber strands, or
- (v) any combination of i, ii, iii, and iv.

Some embodiments of the present disclosure can deposit multiple beads and fiber strands (or bundles of fiber strands) in parallel.

Some embodiments of the present disclosure can deposit:
- (i) a bead of thermoplastic material, or
- (ii) a fiber strand, or
- (iii) both a bead of thermoplastic material and a fiber strand in a substantially straight segment whose longitudinal or neutral axis is:
  - (a) in the X-Y plane and parallel to the X axis, or
  - (b) in the X-Y plane and parallel to the Y axis, or
  - (c) in the X-Y plane and at an acute angle to the X axis, or
  - (d) at a right angle to the X-Y plane, or
  - (e) at an acute angle to the X-Y plane.

Some embodiments of the present disclosure can deposit:
- (i) a bead of thermoplastic material, or
- (ii) a fiber strand, or
- (iii) both a bead of thermoplastic material and a fiber strand in a two-dimensional curvilinear segment (e.g., an arc, substantially a circle, a parabola, a sinewave, a spiral, a cissoid, a Folium of Descartes, a planar spring, etc.) that lies in a plane that is:
  - (a) parallel to the X-Y plane, or
  - (b) at a right angle to the X-Y plane, or
  - (c) at an acute angle to the X-Y plane.

Some embodiments of the present disclosure can deposit:
- (i) a bead of thermoplastic material, or
- (ii) a fiber strand, or
- (iii) both a bead of thermoplastic material and a fiber strand in a helical segment (e.g., a circular helix, a conical helix, a cylindrical or general helix, a left-handed helix, a right-handed helix, etc.) whose axis is:
  - (a) in the X-Y plane, or
  - (b) at a right angle to the X-Y plane, or
  - (c) at an acute angle to the X-Y plane.

The helix can be regular or irregular (like the windings of rope on a spool).

Some embodiments of the present disclosure can deposit:
- (i) a bead of thermoplastic material, or
- (ii) a fiber strand, or
- (iii) both a bead of thermoplastic material and a fiber strand in a polygon (e.g., a triangle, a rectangle, etc.) that lies in a plane that is:
  - (a) parallel to the X-Y plane, or
  - (b) at a right angle to the X-Y plane, or
  - (c) at an acute angle to the X-Y plane.

The polygon can be regular or irregular, simple or not simple, concave or non-concave, convex or non-convex.

In general, some embodiments of the present disclosure can deposit beads of thermoplastic material and fiber strands in many topologies (e.g., a torpid, a cage, etc.).

The fact that some embodiments of the present disclosure can deposit a fiber strand at a non-zero angle to the X-Y plane can create a situation in which the general methodology of depositing beads in a strict layer-by-layer sequence are not possible. Therefore, some embodiments of the present disclosure generate an sequence for depositing the beads and fiber strands that is manufacturable. Such sequences can iteratively progress in both the +X, −X, +Y, −Y, +Z, and −Z directions.

The location of the fiber strands in the object and their geometry and orientation can affect the structural properties of the object. Furthermore, the structural properties of the object can be predicted based on the location of the fiber strands in the object and their geometry. Therefore, some embodiments of the present disclosure accept both a mathematical model of the object and a list of the desired structural properties of the object, and generate a design for:
- (i) the number of fiber strands in the object, and
- (ii) the bundling of the fiber strands in the object, and
- (iii) the material of the fiber strands in the object, and
- (iv) the Young's modulus of the fiber strands in the object, and
- (v) the location of the fiber strands in the object, and
- (vi) the geometry of the fiber strands in the object, and
- (vii) the orientation of the fiber strands in the object, and
- (viii) an sequence for depositing the beads and fiber strands that:
  - (1) attempt to satisfy the desired structural properties of the object, and
  - (2) can be actually be built.

The latter condition is especially important because there are many arrangements of fibers that cannot be manufactured using fused-deposition modeling.

Some embodiments of the present disclosure are capable of depositing support material at a location and removing the support material and re-depositing the support material at the same location and of removing the re-deposited support material. This is to enable the support of a bead and fiber strand at one moment and then after the bead has hardened to enable another bead and fiber strand to be deposited under the first.

Some embodiments of the present disclosure comprise a turntable that supports the object while it is built and that spins under the control of the embodiment's CAD/CAM controller. This facilitates the deposition of circular and helical beads and fiber strands on the object. This also facilitates the ability of the embodiments to deposit beads and fiber strands at any location in the build volume from any approach angle.

BRIEF DESCRIPTION OF THE DRAWINGS

FIG. 1 depicts a front view of manufacturing system 100 in accordance with the illustrative embodiment of the present disclosure.

DETAILED DESCRIPTION

FIG. 1 depicts a front view of manufacturing system 100 in accordance with the illustrative embodiment of the present disclosure. Manufacturing system 100 may comprise:
  CAD/CAM controller 101,
  build chamber 102,
  turn-table 110,
  one or more robotic arms 121, each comprising an extrusion head 122 with an extrusion needle 123,
  thermoplastic filament spool 130-1 and thermoplastic filament 131-1,
  thermoplastic filament spool 130-2 and thermoplastic filament 131-2, and
  fiber strand spool 130-3 and fiber strand 131-3.
The purpose of manufacturing system 100 is to build a three-dimensional object—depicted as object 151 in FIG. 1.

CAD/CAM controller 101 directs the building of object 151 based on a mathematical model of object 151. In accordance with the illustrative embodiment, the mathematical model of object 151 is created with CAD/CAM controller 101, but it will be clear to those skilled in the art, after reading this disclosure, how to make and use alternative embodiments of the present disclosure in which the model is created elsewhere and imported into CAD/CAM controller 101.

CAD/CAM controller 101 may comprise a list of the desired structural properties of object 151. This list may include, but is not limited to:
  1. the desired compression strength characteristics of object 151, and
  2. the desired tensile strength characteristics of object 151, and
  3. the desired resonance characteristics of object 151.

In accordance with the illustrative embodiment, thermoplastic filament 131-1 comprises a continuous tow of 5 low-modulus carbon-fiber strands, and thermoplastic filament 131-2 does not comprise a fiber strand. Thermoplastic filament 131-2 is used as support material in building object 151.

CAD/CAM controller 101 may also comprise a list of the structural properties of thermoplastic filament 131-1. This list may include, but is not limited to:
  1. the compression strength of the thermoplastic and tow of carbon fibers (after deposition and in object 151), and
  2. the tensile strength of the thermoplastic and tow of carbon fibers (after deposition and in object 151), and
  3. the thermal expansion of the thermoplastic and tow of carbon fibers (after deposition and in object 151), and
  4. the Young's modulus of the thermoplastic and tow of carbon fibers (after deposition and in object 151).

CAD/CAM controller 101 may also comprise a list of the structural properties of thermoplastic filament 131-2 and/or fiber strand 131-3.

CAD/CAM controller 101 generates a design for object 151 that:
  (1) attempts to satisfy the desired structural properties of object 151, and
  (2) a sequence for depositing beads of thermoplastic material and support material.

The design for object 151 includes, but is not limited to:
  (i) the location of fiber strands in the object, and
  (ii) the geometry of the fiber strands in the object.

Build chamber 102 is an enclosed environment in which object 151 is built.

Turn-table 110 comprises a platform on which object 151 is built. Turn-table 110 may be driven by a drive mechanism 110-1 that is directed by CAD/CAM controller 101. The drive mechanism 110-1 may comprise a motor arrangement including, but not limited to one or more stepper and/or servo motors. Some embodiments may also include a transmission or gear arrangement for controlled transmission of the rotational movement of the motor(s) to the turn-table 110. The transmission or gear arrangement may include without limitation one or more gears, belts, chains, and combinations thereof.

Various embodiments of the drive mechanism 110-1 may be configured to rotate the turn-table 110 in clockwise and counterclockwise directions around the Z axis under the direction of CAD/CAM controller 101. The drive mechanism 110-1, in various other embodiments, may also be configured to raise and lower the turn-table 110 in the +Z and the −Z directions under the direction of CAD/CAM controller 101. In various other embodiments, the drive mechanism 110-1 may also be configured to move the turn-table 110 in the +X direction, the −X direction, the +Y direction the −Y direction, or any combination thereof.

The one or more robotic arms 121 may be configured to place the dispensing end of the extrusion needle 123 at any location in the build volume of object 151, from any approach angle. This enables manufacturing system 100 to lay fiber strands on the inside an enclosure such as a closed sphere through a hole in the enclosure (e.g., sphere) just large enough for extrusion needle 123. The robotic arms 121, in various embodiments, may be powered by electric motors, hydraulic actuators, or combinations thereof, and configured to provide three or more axes or degrees of freedom so that the extrusion head/needle can move in the +X direction, the −X direction, the +Y direction, the −Y direction, the +Z direction, the −Z direction, or any combination thereof. In one illustrative embodiment, the robotic arm 121 may be configured as a six-axis robotic arm. In another illustrative embodiment, the robotic arm 121 may be configured as a seven-axis robotic arm. Any other suitable positioning assembly capable of placing the dispensing end of the extrusion needle 123 at any location in the build volume of object 151, from any approach angle, may be used in place of the robotic arms 121.

The extrusion head 122 is configured to melt the thermoplastic and extrude the molten thermoplastic (which may partially or wholly contain one or more fiber strands) via the extrusion needle 123. Various embodiments of the extrusion head 122 may define an interior chamber 122-1 for receiving the thermoplastic material. The extrusion head 122 may include a heater or heating element 122-2 for melting the thermoplastic material within the chamber for extrusion through the extrusion needle in liquid form. The extrusion head 122 may include a motor (not shown) or any other suitable mechanism for pushing the thermoplastic material through the chamber 122-2 and out the extrusion needle 123. In some embodiments, the extrusion head 122 may also be configured with a cutting mechanism 122-4 to cut the one or more fiber strands to the appropriate length. The cutting mechanism 122-3 may include a blade or other suitable cutting member for cutting the one or more fiber strands. In one illustrative embodiment, the cutting mechanism 122-3 may be disposed at the dispensing end or tip 123-1 of extrusion needle 123.

Extrusion needle 123 may comprise a hollow tube or nozzle having a first open end that communicates with the chamber of the extrusion head 122 and a second open end (dispending end or tip 123-1) that dispenses the thermoplastic, which may partially or wholly contain one or more fiber strands. The opening of the tip 123-1 may be circular, oval, square, slotted or any other suitable shape that is capable of extruding the thermoplastic material in a desired cross-sectional shape. In various embodiments, the extrusion needle 123 may have a length equal to at least the longest dimension of object 151 so that the tip of 123-1 extrusion needle 123 can deposit material at any location in the build volume of object 151 from any approach angle.

In operation, according to one illustrative embodiment, one or more motors may be used for feeding the filament(s) of thermoplastic material 131-1, 131-2 (and fiber strand(s) 131-3) into the chamber 122-1 of the extrusion head 122 from the spools 130-1, 130-2, 130-3. The thermoplastic material entering the chamber 122-1 is melted by the heater 122-2, and extruded from the extrusion head 122 via the extrusion needle 123. The CAD/CAM controller 101 may control the rate of the one or more feed motors, the temperature of the heater 122-2, and/or the other process parameters mentioned earlier, so that the thermoplastic material and fiber strand(s) can be extruded in a manner that to attempts to satisfy the desired structural properties of object 151.

Although the manufacturing system, methods, thermoplastic filaments, fiber strands, and other associated elements have been described in terms of exemplary embodiments, they are not limited thereto. Rather, the appended claims should be construed broadly to include other variants and embodiments of same, which may be made by those skilled in the art without departing from the scope and range of equivalents of the device, tray and their elements.

What is claimed is:

1. A system for manufacturing at least a portion of a three-dimensional (3D) object adjacent to a support, comprising:
    a spool of filament of thermoplastic material, the filament of thermoplastic material comprising a tow of carbon fibers;
    a build chamber having a side surface and a bottom surface, wherein the side surface and the bottom surface are in contact with each other;
    a support for supporting the at least the portion of the 3D object during manufacturing;
    a positioning assembly having a dispensing end for directing the filament from the spool and into contact with (i) the support or (ii) a previously deposited layer of the 3D object adjacent to the support, wherein the positioning assembly is mounted on the side surface of the build chamber;
    a drive mechanism configured to (i) move the support relative to the dispensing end and (ii) rotate the support in clockwise and counterclockwise directions around a Z axis, wherein the Z axis is perpendicular to an X-Y plane parallel to a surface of the support, and wherein the drive mechanism is mounted on the bottom surface of the build chamber;
    a heater configured to subject the filament to heating;
    a cutter for cutting the tow of carbon fibers to generate the at least the portion of the 3D object; and
    a controller operatively coupled to the cutter, wherein the controller is configured to:
        (i) direct the filament from the spool toward the dispensing end, and
        (ii) upon directing the filament toward the dispensing end:
            (a) direct the drive mechanism to (1) move the support relative to the dispensing end and (2) rotate the support in the clockwise and counterclockwise directions around the Z axis,
            (b) direct the heater to heat the thermoplastic material and the tow of carbon fibers, and
            (c) direct the cutter to cut the tow of carbon fibers to generate a portion of the filament, such that the portion of the filament is deposited towards the support or the previously deposited layer of the 3D object adjacent to the support, thereby manufacturing the at least the portion of the 3D object.

2. The system of claim 1, wherein the controller is configured to direct the filament from the spool toward the dispensing end while the dispensing end is moving along a direction relative to the support or the previously deposited layer of the 3D object adjacent to the support.

3. The system of claim 2, wherein the controller directs the dispensing end along the direction relative to the support or the previously deposited layer of the 3D object adjacent to the support to deposit a subsequent portion of the 3D object by repeating (i) and (ii).

4. The system of claim 1, wherein the controller is configured to direct an additional filament toward the dispensing end for deposition over the support or the previously deposited layer of the 3D object adjacent to the support.

5. The system of claim 4, wherein the additional filament is a thermoplastic filament.

6. The system of claim 1, wherein the controller is configured to direct an additional filament inside of the at least the portion of the 3D object.

7. The system of claim 1, wherein the controller is configured to control a rate at which the filament is directed toward the dispensing end.

8. The system of claim 1, wherein the controller is configured to direct formation of a support structure from a source of a thermoplastic filament prior to manufacturing the at least the portion of the 3D object.

9. The system of claim 1, wherein the positioning assembly is a multi-axis robotic arm supporting the dispensing end, wherein the multi-axis robotic arm is configured to sequentially deposit the at least the portion of the 3D object.

10. The system of claim 9, wherein the multi-axis robotic arm is a six-axis or seven-axis robotic arm.

11. The system of claim 1, wherein the filament is continuous tow filament.

* * * * *